Sept. 2, 1969  T. BUDZICH  3,464,439
FLOW CONTROL VALVE
Filed June 16, 1966

INVENTOR.
TADEUSZ BUDZICH
BY
McNENNY, FARRINGTON, PEARNE & GORDON
ATTORNEYS

United States Patent Office 3,464,439
Patented Sept. 2, 1969

3,464,439
FLOW CONTROL VALVE
Tadeusz Budzich, Moreland Hills, Ohio, assignor to The Weatherhead Company, Cleveland, Ohio, a corporation of Ohio
Filed June 16, 1966, Ser. No. 558,132
Int. Cl. F16k 1/44
U.S. Cl. 137—504                                8 Claims

ABSTRACT OF THE DISCLOSURE

A flow control valve for regulating the flow of fluid in a system which includes a housing having a bore therein which communicates with inlet and outlet ports. A sleeve defining a metering orifice is slidably disposed in the bore. Throttling port means is provided between the metering orifice and the outlet port and is operable by movement of the sleeve to provide a decreasing throttling area as the sleeve moves in the bore away from the inlet. The sleeve is spring-biased toward the inlet port and a probe extends axially into the metering orifice. The probe has a tapered exterior shape of increasing diameter away from the inlet port and the metering orifice so that the probe reduces the effective area of the orifice over the entire range of movement of the sleeve as the sleeve moves away from the inlet port to provide the aforementioned decreasing throttling area.

---

This invention relates generally to valves and more particularly to flow control or limiting valves for regulating the rate of flow in a fluid system.

In many applications of hydraulic power, there is a need to regulate the maximum rate of fluid flow through a conduit so that while the flow may be less than a given amount it is regulated or limited so as not to exceed a predetermined level regardless of changes in the pressure and other conditions in the system. For example, where a single pump is used to supply a plurality of selector or directional control valves, in order to insure an adequate supply to each valve a flow control or limiting valve is placed at the inlet to each valve to insure that the total flow through the selector control valves will not exceed the pump's capacity in order to insure an adequate rate of flow through each of the control valves. The line pressure may vary over a wide range depending upon the load which is controlled by the selector valve. Thus, it is desirable that the flow regulating valve be operable independent of line pressure and that it operate in a precise manner to positively prevent an excess rate of flow.

Because in many applications a separate flow controlling or limiting valve is required for each selector control valve to insure proper proportioning of the available fluid flow to the various load elements in the system, it is desirable for reasons of compactness and efficiency to incorporate a flow control or limiting valve in the selector valve. This requires that the flow control valve be compact in size yet still give dependable operation with a high flow capacity. The use of such a flow control valve with a given selector valve may be optional and it is therefore desirable that the flow control or limiting valve be arranged in such a manner that the installation of such a valve in the selector control valve body may be optional and to allow its removal if the flow limiting properties of the valve are not necessary. Likewise, the flow control valve should allow for easy external adjustment and be relatively insensitive to changes in fluid viscosity resulting from different temperatures or use of different fluids in the system.

It is therefore the principal object of this invention to provide a novel flow limiting valve operable to limit the maximum flow responsive to the volume of flow and independently of the fluid pressure upstream or downstream of the valve.

It is another object of this invention to provide a novel flow limiting valve which allows external adjustment of the maximum rate of flow and which is of compact size and simple construction.

It is another object of this invention to provide a novel flow limiting valve in which the metering is accomplished by a sharp-edged orifice.

It is another object of this invention to provide a novel flow limiting valve in which the regulation takes place by a movable throttling orifice downstream of and controlled by the adjustable metering orifice.

It is still another object of this invention to provide a novel flow limiting valve which regulates the rate of flow by varying the area of the orifice and hence the pressure drop across the orifice to control the downstream throttling orifice.

It is still another object of this invention to provide a novel flow limiting valve as set forth in the preceding object in which the change in pressure drop for a given flow across the variable area orifice compensates for the spring characteristics of the spring biasing one of the orifice members which moves to change the orifice area.

The foregoing and other objects and advantages of this invention are accomplished in the preferred embodiment of the invention which utilizes a slidable sleeve having at one end a sharp-edged orifice which moves coaxially with respect to a tapered probe extending through the orifice so that movement of the orifice carrying sleeve relative to the probe changes the effective metering area of the orifice. The sleeve also controls a throttling port on the downstream side of the orifice, the area of which is controlled by movement of the sleeve to regulate and limit the flow through the valve. The probe may be adjustable along its axis to vary the maximum flow through the valve and is shaped in such a manner that movement of the sleeve during throttling to reduce the area of the metering orifice creates a change in the pressure drop across this orifice corresponding to the spring rate of the spring to provide constant flow characteristics at all times.

Further objects and advantages of this invention will readily become apparent to those skilled in the art upon comprehension of the preferred embodiment of the invention shown in the drawings and described in the accompanying detailed description.

Figure 1:
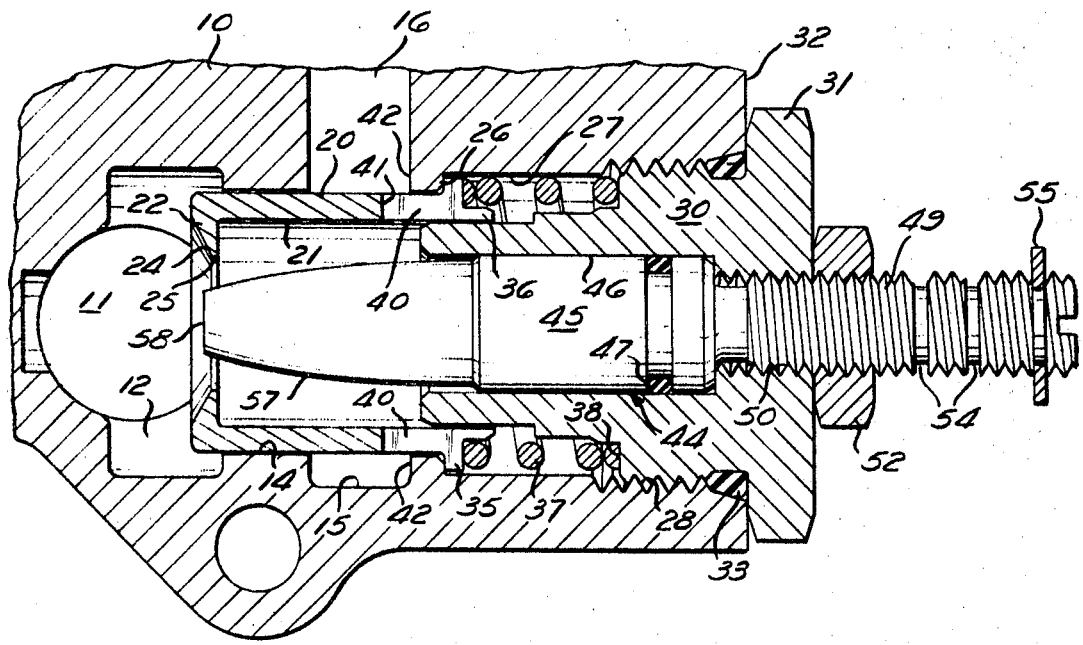
FIGURE 1 is a longitudinal cross-sectional view through a flow control or limiting valve according to the preferred embodiment of the invention.

Referring now to the drawings in greater detail, FIGURE 1 shows the flow control or limiting valve mounted within a housing 10 which may be a portion of a selector control valve or other unit of a hydraulic system. The housing 10 is supplied with fluid through an inlet passage 11 to enter an enlarged inlet chamber 12 from which extends a cylindrical bore 14. Along its length, the bore 14 is provided with an annular cored passage or outlet chamber 15 connected to the outlet passage 16 leading to the remainder of the valve structure.

A cylindrical sleeve 20 is slidably mounted within the bore 14 to have a free sliding but substantially sealing fit with its end completely exposed to the fluid pressure in chamber 12. The sleeve 20 has a wall of substantially uniform thickness formed by the inner sleeve bore 21 which is closed off at the end adjacent the inlet chamber 12 by an inwardly extending end wall 22. The end wall 22 is formed with a conical chamfered portion 24 and a metering orifice opening 25 of minimum axial width so as to define a sharp-edged orifice and obtain the flow characteristics of this type orifice for metering purposes.

The bore 14 opens at its other end into an enlarged counterbore 27 forming a radial shoulder 26 therebetween. At its outer end, the counterbore 27 has a threaded portion 28 to receive a threaded plug 30 which has a radial flange 31 which seats against the face 32 of the housing to positively locate the axial position of the plug 30 within the counterbore 27. A suitable sealing ring 33 is provided to prevent leakage between the plug 30 and the threaded portion 28.

The sleeve 20 extends into the counterbore 27 where it is provided with a radial flange 35 which abuts against the shoulder 26 to position the sleeve. The sleeve 20 also has an axial skirt 36 which cooperates with the flange 35 to provide a seat for a helical compression spring 37 located within the counterbore 27. At its other end, the spring 37 seats against a shoulder 38 on the plug 30 and serves to bias the sleeve 20 toward the inlet chamber 12 so that the flange 35 is seated normally against the shoulder 26.

Figure 2:
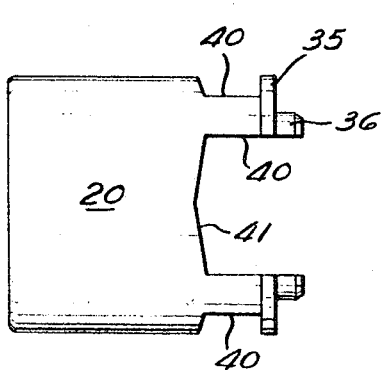
FIGURE 2 is a side-elevational view of the metering sleeve of the valve shown in FIGURE 1.
Figure 3:
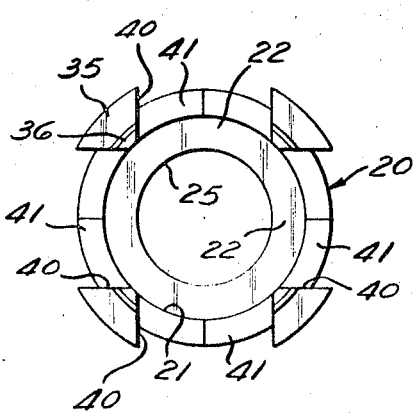
FIGURE 3 is an end-elevational view of the sleeve of FIGURE 2.

As shown in greater detail in FIGURES 2 and 3, the sleeve 20 is formed with a plurality, here shown as being four in number, of axially extending slots 40 formed in the wall of the sleeve and extending through flange 35 and skirt 36. The slots 40 are formed with slightly V-shaped end surfaces 41 which cooperate with the adjacent side wall 42 of the cored outlet chamber 15 to provide a throttling action for the fluid passing from the interior of the sleeve into the outlet chamber 15 which will result from changing the effective opening by movement of the sleeve 20 toward the plug 30.

In order to allow adjustment of the effective area of the metering orifice opening 25 and to compensate for the changes in pressure drop across the orifice to position the sleeve 20 at different axial positions because of the spring rate of the spring 37, a probe indicated generally at 44 is positioned within the sleeve 20. The probe 44 has a cylindrical portion 45 which fits within an axial bore 46 in the plug 30 with which it makes sealing engagement by means of an O-ring seal 47 to prevent outward leakage of fluid. The probe 44 has a threaded shank 49 which is received in a threaded bore 50 in the plug 30 so that by rotation of the shank 49 the axial position of the probe 44 with respect to the plug 30 may be adjusted as desired. A lock nut 52 mounted on the shank 49 secures the probe in the adjusted position and the threaded shank 49 may be provided with a number of annular grooves 54 to receive spring clips 55 which serve as stops to allow ready adjustment of the probe to preset positions.

The probe 44 has a conical tapered portion 57 extending beyond the end of the plug 30 within the sleeve 20 to terminate in an end 58 within the metering orifice opening 25. When the flow control valve is adjusted to the maximum regulated rate of flow as shown in FIGURE 1, the end 58 projects beyond the opening 25 and into the inlet chamber 12 so that for all positions of the probe and the sleeve the tapered portion 57 lies within the metering orifice opening 25.

The tapered portion 57 is arranged to have a shape in accordance with the preload and spring rate of the spring 37. The shape is chosen so that when the sleeve 20 is in the position shown with the shoulder 38 abutting against the shoulder 26 of housing 10, the pressure drop across the effective metering orifice area, which is reflected as an unbalanced force on the sleeve 30 tending to move it toward the right as shown in FIGURE 1, is, at the rated rate of flow, substantially equal to the preload of the spring 37. Under these conditions, the sleeve 20 will remain in this position as long as the rate of flow entering the valve through the passage 11 and leaving through the passage 16 is not greater than the maximum determined by the axial position of the probe with respect to the plug 30.

In the event of a pressure differential caused by, for example, a pressure drop at the outlet 16 caused by a greater demand for fluid, any increase in the rate of flow through the metering orifice opening 25 and around the tapered probe portion 57 will cause an increase pressure drop at the metering orifice and increase the unbalanced biasing force to shift the sleeve 20 toward the right. As the sleeve 20 moves toward the right it requires increasing force because of the spring rate of the spring 37. Accordingly, because of the shape of the tapered portion 57, the effective area of the metering orifice decreases so that at the same rate of flow the pressure drop will increase so that the increased unbalanced fluid pressure biasing force on the sleeve 20 will equal the increased biasing force of the spring 37. Thus, regardless of the position of the sleeve 20, the forces of the pressure drop acting on the sleeve 20 and the biasing force of the spring 37 will remain balanced for the same rate of flow through the valve and this rate of flow will not increase or decrease.

However, as the sleeve 20 moves toward the right, the ends 41 of the slots 20 move toward the side walls 42 of the cored opening 15 to decrease the area of these openings to throttle the fluid flow. Thus, the sleeve 20 will move to the right only to a position where the throttling taking place, between the slot ends 41 and the side wall 42 is effective to limit the fluid flow into the outlet passage 16 to the regulated amount determined by the position of probe 44. Thus, the valve automatically compensates for varying flow conditions resulting from different pressure differentials between the inlet and outlet to maintain the same maximum regulated rate of flow. Because of the shape of the tapered portion 57, the rate of flow through the orifice compensates for the spring rate of the biasing spring 37, to permit use of a high rate spring, while the actual throttling to reduce flow takes place at the throttling openings formed by the slots 40. The fact that at different rates of flow determined by the axial position of the probe 44, the effective throttling openings of the slots 40 will vary does not affect the operation of the valve because of the compensation of the biasing force of spring 37 provided by the shape of the tapered portion 57.

For these reasons, the valve is self-regulating to be independent of the pressure levels at the inlet and outlet and because it is responsive solely to the pressure drop across the orifice, and this pressure drop is determined solely by the rate of flow and not the pressure, the valve gives dependable and precise operation under a wide range of conditions while providing an accurate and positive regulation of the maximum rate of fluid flow. This arrangement gives a small envelope or size to the valve which allows it to be easily included within a housing containing a selector control valve, and because of its cartridge arrangement, if the valve is not required for a particular application of the selector valve contained in the housing 10, the entire valve assembly can be removed by removing the plug 30 together with spring 37 and sleeve 20 and replacing them by a plain plug to allow free flow from the inlet passage 11 to the outlet passage 16.

What is claimed:

1. A flow regulating valve comprising a housing having a fluid inlet and a fluid outlet, a bore in said housing interconnecting said inlet and said outlet, an orfiice member slidably disposed in said bore and having a metering orifice to allow fluid flow from said inlet toward said outlet, throttling port means between said metering orifice and said outlet and operable by movement of said member to provide a decreasing throttling area as said member moves in said bore away from said inlet, a spring biasing said member toward said inlet, stop means arranged to limit movement of said sleeve toward said inlet, said member providing an unbalanced area exposed to fluid pressure at said inlet to bias said member away from said inlet with a force proportional to the pressure drop across said metering orifice, and a probe carried by said housing and extending axially into said metering orifice when said sleeve is against said stop means, said probe having a tapered exterior shape of increasing diameter away from said inlet and said metering orifice, said probe reducing the effective area of said orifice over the entire range of movement of said member as said member moves away from said inlet to provide said decreasing throttling area.

2. A flow regulating valve comprising a housing having a fluid inlet and a fluid outlet, a bore in said housing interconnecting said inlet and said outlet, an orifice member slidably disposed in said bore and having a metering orifice to allow fluid flow from said inlet toward said outlet, throttling port means between said metering orifice and said outlet and operable by movement of said member to provide a decreasing throtling area as said member moves in said bore away from said inlet, a spring biasing said member toward said inlet, said member providing an unbalanced area exposed to fluid pressure at said inlet to bias said member away from said inlet with a force proportional to the pressure drop across said metering orifice, and a probe carried by said housing and extending axially into said metering orifice, said probe having an exterior shape arranged to reduce the effective area of said metering orifice over the entire range of movement of said member as said member moves away from said inlet so that at a constant rate of fluid flow through said orifice the increase in pressure drop biasing said sleeve away from said inlet resulting from the decrease in effective metering orifice area is proportional to the increasing biasing force of said spring and the changing area of said throttling port means serves to throttle and regulate the flow of fluid between said inlet and said outlet.

3. A flow regulating valve comprising a housing having a fluid inlet and a fluid outlet, a bore in said housing interconnecting said inlet and said outlet, a hollow tubular sleeve member slidably disposed in said bore, said sleeve having a metering orifice at the end adjacent said inlet to allow fluid flow from said inlet to the interior of said sleeve, cooperating port means on said sleeve and said housing interconnecting the interior of said sleeve and said outlet and arranged to provide a decreasing throttling area as said sleeve moves in said bore away from said inlet, a spring biasing said sleeve toward said inlet, stop means arranged to limit movement of said sleeve toward said inlet, said sleeve providing an unbalanced area exposed to fluid pressure at said inlet to bias said sleeve away from said inlet with a force proportional to the pressure drop across said metering orifice, and a probe carried by said housing and extending axially within the interior of said sleeve into said metering orifice when said sleeve is against said stop means, said probe having an exterior shape arranged to reduce the effective area of said metering orifice over the entire range of movement of said sleeve as said sleeve moves away from said inlet so that at a constant rate of fluid flow through said metering orifice the increase in pressure drop biasing said sleeve away from said inlet resulting from the decrease in effective metering orifice area is proportional to the increasing biasing force of said spring and the changing area of said cooperating port means serves to throttle and regulate the flow of fluid between said inlet and said outlet.

4. A flow regulating valve as set forth in claim 3 wherein said cooperating port means comprises openings in the side wall of said sleeve and an annular cored recess in said housing opening into said bore.

5. A flow regulating valve as set forth in claim 3 wherein said metering orifice is formed in the end wall of said sleeve to have a portion of reduced axial width at said orifice to provide the flow characteristics of a sharp-edged orifice.

6. A flow regulating valve comprising a housing having an axial bore, a fluid inlet at one end of said bore, an outlet port in said bore intermediate the ends thereof, a hollow tubular sleeve member slidably disposed in said bore, said sleeve having a metering orifice at the end adjacent said inlet to allow fluid flow from said inlet to the interior of said sleeve, said sleeve extending axially toward said other end of said bore beyond said outlet port, port means on said sleeve interconnecting the interior of said sleeve and said outlet port and arranged to provide a decreasing throttling area between said ports as said sleeve moves in said bore away from said inlet, a plug in said other end of said bore, a spring in said bore between said plug and said sleeve biasing said sleeve toward said inlet, stop means arranged to limit movement of said sleeve toward said inlet, said sleeve providing an unbalanced area exposed to fluid pressure at said inlet to bias said sleeve away from said inlet with a force proportional to the pressure drop across said metering orifice, and a probe mounted on said plug and extending axially within the interior of said sleeve into said metering orifice when said sleeve is against said stop means, said probe having an exterior shape arranged to reduce the effective area of said metering orifice over the entire range of movement of said sleeve as said sleeve moves away from said inlet so that at a constant rate of fluid flow through said metering orifice the increase in pressure drop biasing said sleeve away from said inlet resulting from the decrease in effective metering orifice area is proportional to the increasing biasing force of said spring and the changing area between said outlet and sleeve port means serves to throttle and regulate the flow of fluid between said inlet and said outlet port.

7. A flow regulating valve as set forth in claim 6 wherein said probe has a threaded shank engaged in said plug and extending to the exterior of said plug and said housing to allow external adjustment of the regulated flow rate of the valve by changing the axial position of said probe with respect to the position of said metering orifice when said sleeve is positioned by said stop means.

8. A flow regulating valve as set forth in claim 6 wherein said sleeve port means comprises a plurality of axially extending slots in the wall of the sleeve.

References Cited
UNITED STATES PATENTS

| | | | |
|---|---|---|---|
| 334,011 | 1/1886 | Franklin | 137—503 |
| 1,159,214 | 11/1915 | Gueux | 137—503 |
| 1,933,852 | 11/1933 | Hahn | 137—504 |
| 3,120,243 | 2/1964 | Allen et al. | 137—504 |

M. CARY NELSON, Primary Examiner

ROBERT J. MILLER, Assistant Examiner